No. 742,752. PATENTED OCT. 27, 1903.
N. W. THOMPSON.
HARROW.
APPLICATION FILED FEB. 18, 1903.
NO MODEL. 2 SHEETS—SHEET 2.
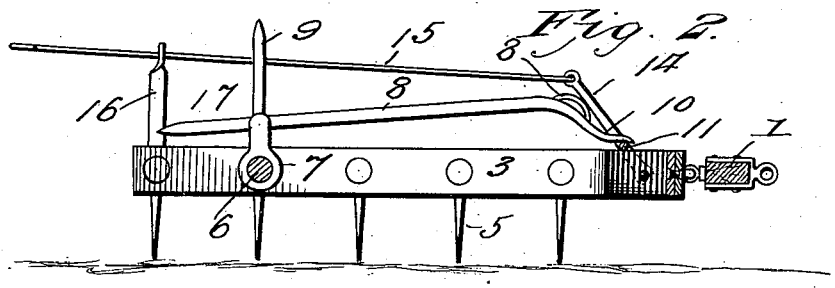
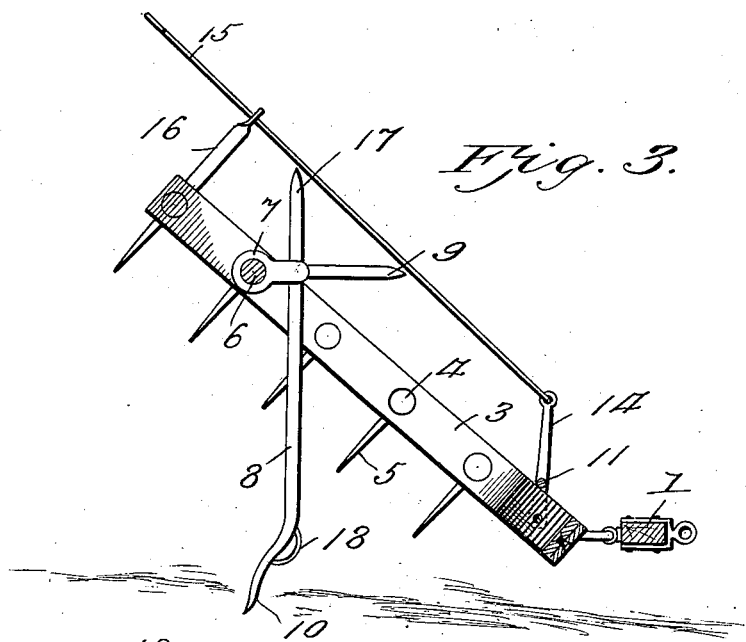
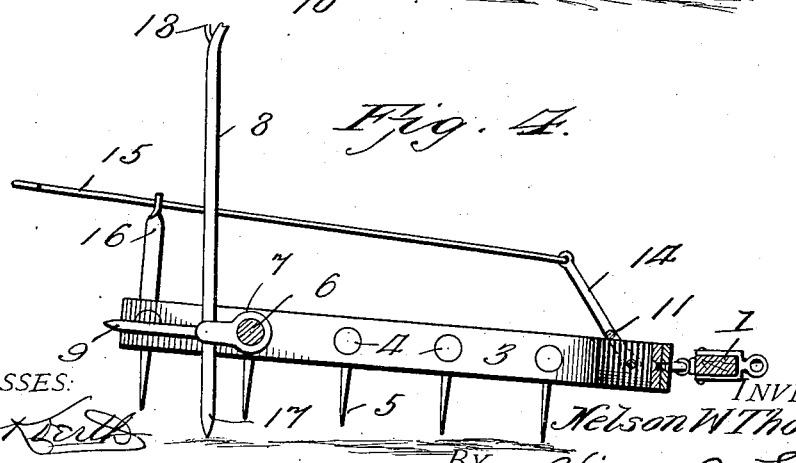

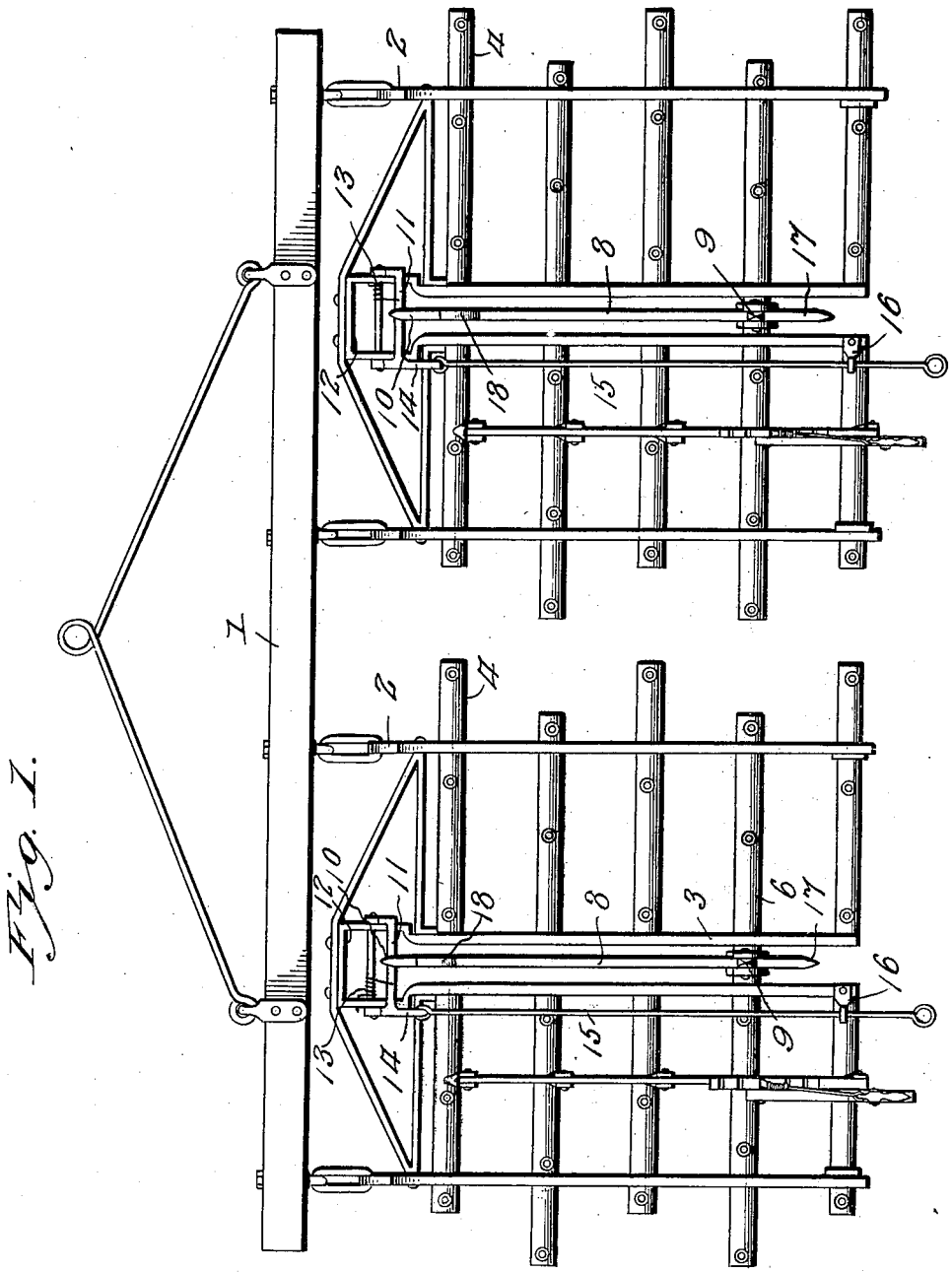

No. 742,752.

Patented October 27, 1903.

UNITED STATES PATENT OFFICE.

NELSON W. THOMPSON, OF ERSKINEVILLE, OREGON.

HARROW.

SPECIFICATION forming part of Letters Patent No. 742,752, dated October 27, 1903.

Application filed February 18, 1903. Serial No. 143,928. (No model.)

*To all whom it may concern:*

Be it known that I, NELSON W. THOMPSON, a citizen of the United States, residing at Erskineville, in the county of Sherman and State of Oregon, have invented new and useful Improvements in Harrows, of which the following is a specification.

My invention relates to new and useful improvements in harrows, and it is more especially an improvement upon the device described and claimed in my application filed October 18, 1902, Serial No. 127,839.

The object of this invention is to provide a jack which is located within the body of each harrow-section and which is adapted when tripped to swing downward into engagement with the ground and raise the harrow-section, so as to permit weeds and other vegetable growths thereon to fall from the teeth of the harrow.

A further object is to so arrange the jack as to enable the same to expedite the removal of said growths from the teeth.

With the above and other objects in view the invention consists in providing a harrow-frame having parallel longitudinally-extending bars at the center thereof, to which are connected the inner ends of the bars of the harrow-teeth. One of these tooth-bars extends through the longitudinally-extending bars of the harrow-section, and a sleeve is journaled thereon and has a jack-bar connected thereto and extending longitudinally within the opening formed between said longitudinal bars. The forward end of the jack-bar is sharpened and is held normally raised from the ground by means of a yoke. Tripping means are provided, however, whereby said yoke may be thrown from under the jack-bar, and the same is caused to fall into contact with the ground. The rear end of the jack-bar is also sharpened, and a sharpened arm extends from the sleeve at right angles to the jack-bar. When the bar falls into engagement with the ground, the harrow-section will be raised during its continued forward movement, and said bar will come into contact with the weeds or other material which may have accumulated upon the harrow-teeth and will force them downward, thereby assisting in the clearing of the teeth. The sharpened arm and the rearwardly-extending end of the jack-bar come into contact with the ground successively, and said bar, as well as the harrow-section, is thus brought back into its normal position.

The invention also consists in the novel construction and combination of parts hereinafter more fully described, illustrated, and claimed.

In the drawings, Figure 1 is a plan view showing two harrow-sections constructed in accordance with my invention and connected to the front bar of a harrow. Fig. 2 is a central longitudinal section through one of said sections. Fig. 3 is a similar view showing the positions of the jack-bar and harrow-section after said bar has been placed in contact with the ground. Fig. 4 is a similar view showing the jack-bar in vertical position just prior to the completion of its movement.

Referring to the figures by numerals of reference, 1 is the front bar of a harrow, to which one or more harrow-sections 2 may be connected. Each of these sections has two parallel longitudinally-extending bars 3, which are arranged at the center thereof and serve to support the inner ends of the bars 4 of the harrow-teeth 5. One of the bars of the teeth 5 extends from one side to the other of the harrow-section at a point adjacent to the rear thereof, as shown at 6, and that portion of this bar which is located between the longitudinally-extending bars 3 serves as a bearing for a sleeve 7, having a jack-bar 8 connected thereto and adapted to move within the opening formed between the said bars 3. Both ends of the jack-bar are sharpened, and a pointed arm 9 extends from sleeve 7 at right angles to the bar 8. The forward end 10 of the jack-bar normally rests upon a yoke 11, which extends over and is fulcrumed upon a bracket 12, arranged at the center of the front of the harrow-section. This yoke is held normally in position under the end of the jack-bar by means of a coiled spring 13. An arm 14 projects upward from the yoke and has a rod 15 connected thereto and slidably mounted within a bracket 16, which is located at the rear end of the harrow-section.

The parts are normally in the positions illustrated in Figs. 1 and 2. When it is desired to remove weeds or other material from the teeth of the harrow, rod 15 is moved forward, thereby swinging yoke 11 from under the forward end 10 of the jack-bar. Said bar promptly swings down, so as to bring the end thereof into engagement with the ground, and as the harrow-section continues to move forward it will be tilted upward into the position shown in Fig. 3. Arm 9 and the rear end 17 of the jack-bar will then successively come into engagement with the ground and will swing the jack-bar 8 upward into a vertical position and finally throw it back into normal position upon the yoke 11. This yoke is returned to its normal position as soon as rod 15 is released by the spring 13, before referred to.

If desired, a stop 18 may be arranged adjacent to the forward end of the bar 8, so as to limit the downward movement of said bar into the ground.

As the jack-bar 8 is located within the harrow, a compact device is provided, and, moreover, said bar also serves to assist in the removal from the teeth 5 of any material which may have accumulated thereon.

In the foregoing description I have shown the preferred form of my invention; but I do not limit myself thereto, as I am aware that modifications may be made therein without departing from the spirit or sacrificing any of the advantages thereof, and I therefore reserve the right to make all such changes as fairly fall within the scope of the invention.

Having thus fully described the invention, what is claimed as new is—

1. The combination with a harrow-section having parallel bars extending longitudinally therethrough and forming a longitudinally-extending opening therebetween; of a jack-bar journaled within the opening, and means for holding and tripping said bar.

2. The combination with a harrow-section having an opening extending longitudinally therethrough; of a sleeve journaled within the opening, a jack-bar connected thereto and having reduced ends, an arm secured to the sleeve and at an angle to the jack-bar, and means for holding and tripping the bar and arm.

3. The combination with a harrow-section having parallel longitudinally-extending bars therein forming a longitudinal opening; of a tooth-bar extending through said opening, a sleeve journaled upon said tooth-bar and within the longitudinal opening, a jack-bar connected to the sleeve and having reduced ends, an arm connected to the sleeve and extending at an angle to the bar, and means for holding and tripping the bar and arm.

4. The combination with a harrow-section having parallel longitudinally-extending bars therein, of harrow-teeth arranged at opposite sides of said bars, a sleeve journaled between the bars, a jack-bar connected to the sleeve and having reduced ends, an arm connected to the sleeve and arranged at an angle to the bar, said arm having a reduced end, and means for holding and tripping the jack-bar and arm whereby said bar is adapted to swing longitudinally of the teeth of the harrow.

In testimony whereof I affix my signature in presence of two witnesses.

NELSON W. THOMPSON.

Witnesses:
E. R. HICKSON,
H. A. MOORE.